United States Patent Office 3,095,226
Patented June 25, 1963

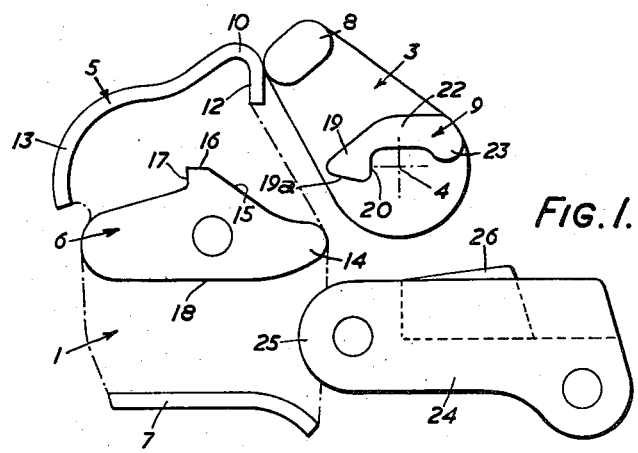
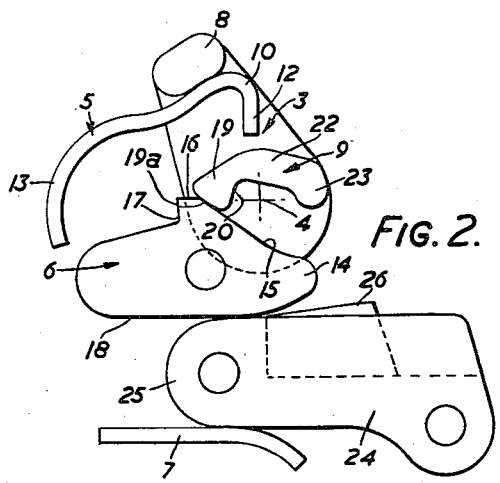
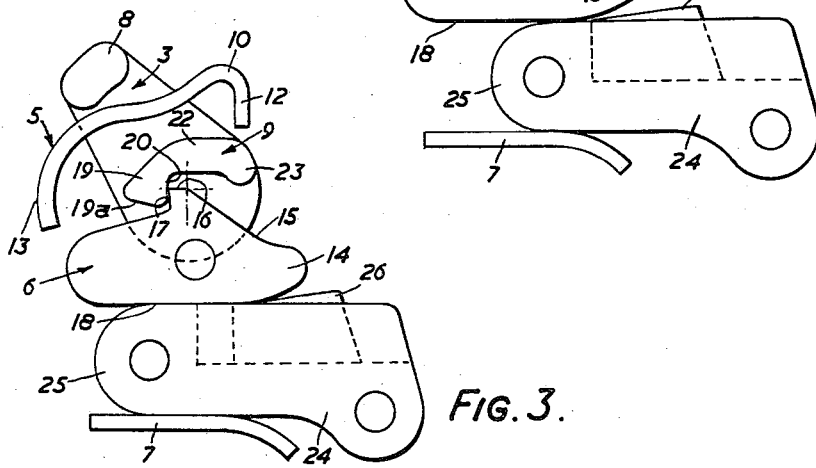

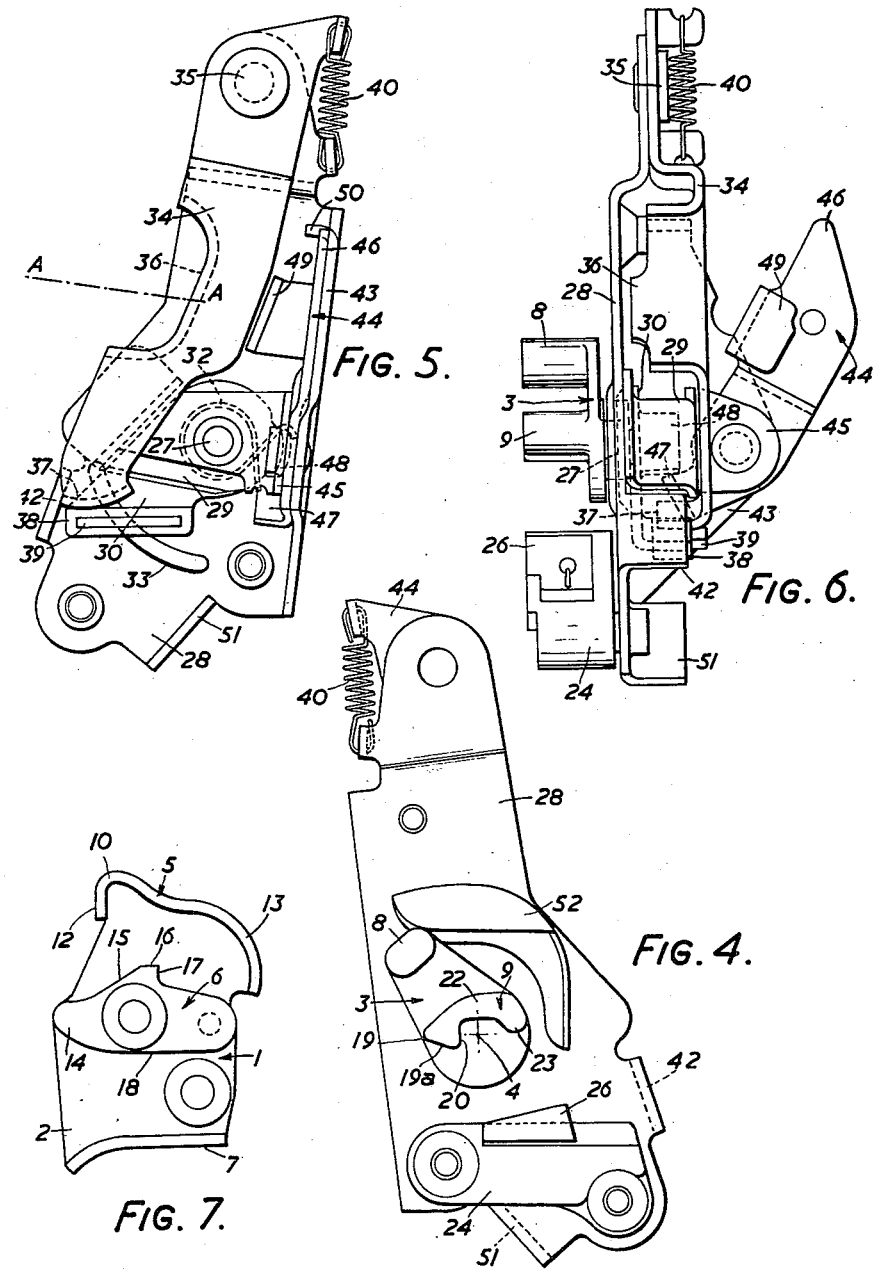

3,095,226
RELEASABLE FASTENING DEVICES
Victor Chanaryn and Kenneth Peter Pugh, Solihull, England, assignors to Wilmot-Breeden Limited, Birmingham, England
Filed Jan. 4, 1960, Ser. No. 255
Claims priority, application Great Britain Jan. 8, 1959
7 Claims. (Cl. 292—221)

This invention relates to releasable fastening devices.

Releasable fastening devices have recently come into common use, particularly for fastening vehicle doors, of a type which embody two parts between which relative angular and translatory movement occurs during a fastening operation, one of which parts is urged in the angular sense towards and into a relative coupling position, for example by spring loading, and requires the application of a positive turning movement during a releasing operation. Examples of such fastening devices are described in Patent No. 3,002,369 and Patent No. 3,002,778 and it is with fastening devices of this type that the present invention is concerned.

With devices of the above type the parts have to be formed so that their initial engagement serves to produce relative angular movement in the uncoupling direction, and the object of the invention is to provide a novel formation of the parts which achieves this and provides a fastening device particularly suitable for use with a door pillar which is usually narrow in the fastening direction.

According to the invention the two parts of a fastening device of the aforesaid type between which relative angular and translatory movement occurs during the fastening operation each comprise two separate portions, two of the portions initially engaging during said translatory movement to produce relative angular movement of the parts in the uncoupling direction and the other two portions entering into coupling engagement at the end of the fastening operating.

Preferably one of the parts is rotatably mounted about a fixed axis whilst the other part remains fixed at least in the angular sense. The latter part, which may for example be arranged for mounting on a vehicle body pillar, is preferably of integral construction though the two portions thereof may be formed for separate attachment to the body pillar.

The formation of the two portions which enter into said coupling engagement is preferably such that, as described in the aforesaid Patent No. 3,002,778, the reaction force between them as a result of any tendency for reverse relative translatory movement is substantially aligned with the direction of such movement and produces substantially no torque about the rotational axis of the rotatably mounted part.

Preferably the portions of the parts which initially engage are formed so that in the event of incomplete fastening of the device they enter into coupling engagement to provide a "safety lock" condition. The arrangement may be such that in this safety lock condition the reaction force between these portions as a result of any tendency for reverse relative translatory movement of the parts passes substantially through said rotational axis. Conveniently, after said two portions have reached their relative safety lock position further relative translatory movement causes interengagement of leading faces of the other two portions to produce further relative angular movement of the parts in the uncoupling direction prior to these portions entering into their fully fastened coupling engagement.

Guiding means may be provided to ensure correct engagement of the parts and they are desirably formed to enable such engagement to proceed smoothly in the event of some misalignment of the parts. These guiding means preferably have surfaces which interengage not only to guide the parts into their relative coupling position but also to provide restraint, when the device is fastened, in a direction transverse to that of said relative translatory movement. A spring-loaded wedge may be mounted on one of these surfaces to provide a wedging component of the restraint.

The invention will now be further described with reference to the accompanying drawings which illustrate by way of example, a vehicle door fastening device in accordance with the invention, and in which:

FIGURES 1 to 3 diagrammatically illustrate progressive stages by which a rotatably mounted part of the device engages with a stationary part during a fastening operation, FIGURE 4 is a front view of the main portion of the device which in use is mounted in the vehicle door, FIGURE 5 is a corresponding rear view illustrating the internal elements of the device, FIGURE 6 is a side view further illustrating these elements, and FIGURE 7 is a front view of a keeper of the device which in use is mounted on the vehicle body.

The fastening device comprises the stationary part in the form of a keeper 1 (see FIGURES 1, 2, 3 and 7) having a backplate 2 which in use is fixed to the corresponding body pillar of the vehicle and the rotatably mounted part 3 (see FIGURES 1 to 4) which in use is carried by the door pillar and which when viewed in the direction of its rotational axis 4 (as in FIGURES 1 to 4) is of generally ovoid profile. Three vertically separate portions 5, 6 and 7 of the keeper project from the back-plate 2 thereof, and the part 3 has its rotational axis 4 disposed at the centre of its rounded larger end and has two separate projecting portions 8 and 9 which respectively cooperate with the two upper keeper portions 5 and 6 during the fastening operation in a manner described hereinafter.

The uppermost portion 5 and lowermost portion 7 of the keeper 1 are respectively bent up from the upper and lower edges of the backplate 2, and the intermediate portion 6 is a plate-like member fixed to the backplate 2.

The keeper portion 5 has a downwardly and rearwardly inclined sinuous profile with a sharply rounded end 10 which merges at the front into a vertical downwardly directed leading section 12 and merges at the rear into a downwardly concave arcuate tail section 13 which terminates close to the portion 6 just behind the latter. A rounded nose section 14 of the portion 6 merges into an upwardly inclined leading edge surface 15 which itself merges into a level upper surface 16 terminating in a slightly undercut step 17 disposed substantially midway along the portion 6. The nose section 14 also merges gradually into a lower flat guiding surface 18 which is substantially aligned with the direction of relative translatory movement of the parts, hereinafter termed "the fastening direction."

The portion 8 of the rotatable part 3 is located at the smaller end of the latter and has a rounded profile, whilst the lower portion 9 has a cam profile and is located slightly above the rotational axis 4. This cam profile has a front or leading lobe 19 which presents a rounded nose portion and terminates in a step 20 disposed substantially at, but slightly offset forwardly of the axis 4 and which, when the parts 1 and 3 are in their relative coupling position, lies substantially normal to the fastening direction. The cam profile has an elongated intermediate section 22 which terminates in a downwardly directed rear lobe 23.

The rotatable part 3 is spring loaded in its positive coupling direction towards a normal resting position which corresponds to said relative coupling position and in which further angular movement in that direction is limited by stop means hereinafter described.

As the parts 1 and 3 approach during fastening operation (see FIGURE 1) initial engagement occurs between the portion 8 of the rotatable part 3 and the sharply rounded end 10 of the keeper portion 5. This initial engagement produces a torque which rotates the part 3 against its spring loading so that the portion 8 rides over the leading crest of the sinuous profile of the keeper portion 5 and engages behind that crest under the action of the spring loading (see FIGURE 2). This latter engagement provides a safety lock condition during which a concave face of the upper portion 8 of the rotatable part 3 mates with the engaged crest surface of the keeper portion 5. In the safety lock position a flat surface 19a on the front lobe 19 of the cam profile engages with the leading edge surface 15 of the keeper portion 6 to provide a positive location of the parts 1 and 3 in the fastening direction. The safety lock condition described above can occur when the vehicle door is slammed with insufficient force to effect complete engagement of the parts 1 and 3 but with sufficient force to cause the upper portion 8 of the part 3 to ride over the front crest of the uppermost keeper portion 5.

On further inward movement of the rotatable part 3 beyond the safety lock position, the front lobe 19 rides over the leading edge surface 15 and the level upper surface 16 of the keeper portion 6 until it clears the undercut step 17 of the latter, whereupon the rotatable part 3 is free to turn under the action of its spring loading to its coupling or fully locked position. In this position (see FIGURE 3) the step 20 in the cam profile engages behind the step 17 in the keeper portion 6 to provide a coupling engagement of the parts 1 and 3, such that the reaction force between them as a result of any tendency for the door to open is substantially aligned with the fastening direction and produces substantially no torque on the rotatable part 3 about its rotational axis 4.

The slight undercut of the step 17 is arranged so that normally when fully engaged the parts 1 and 3 are in line contact substantially at the axis 4 but slightly offset therefrom in a direction substantially aligned in the fastening direction, and this arrangement allows some angular misalignment of the parts 1 and 3 when coupled to be tolerated before the limiting condition of facial contact of the two steps 17 and 20 is obtained and said reaction between the parts 1 and 3 produces any substantial torque on the rotatable part 3.

The slight offset of the point of engagement of the parts 1 and 3 when coupled from the axis 4 facilitates easy release and engagement of these parts and allows for tolerances in their manufacture. Ideally, however, if they could be manufactured with sufficient accuracy and engaged with perfect alignment during the fastening operation the parts 1 and 3 would be arranged to engage exactly at their centre of relative rotary movement, i.e. on the axis 4.

The rear lobe 23 of the cam profile is so formed that in the event of spring failure, or of such rapid closing of the door that the spring is substantially overridden, this lobe will contact the leading edge surface 15 of the keeper portion 6 to produce a torque on the part 3 in the coupling direction which will act to urge that part into its coupling position. In the event of considerable overtravel of the door against the action of the resilient door seals, the front lobe 19 contacts the aforesaid tail section 13 of the keeper portion 5, and this contact also acts to urge the rotatable part 3 towards its coupling position.

The surface 18 of the intermediate keeper portion 6 and an upper guiding surface of the lowermost keeper portion 7, both of which are outwardly flared at their leading ends, form part of guiding means which include a fixed member 24 mounted for translational movement with the rotatable part 3. This fixed member 24 has upper and lower surfaces which engage respectively with the guiding surfaces of the keeper portions 6 and 7 to ensure correct engagement of the parts 1 and 3, and the member 24 has a rounded nose portion 25 which enables such engagement to proceed smoothly in the event of some initial vertical misalignment of the parts 1 and 3. The interengagement of the surfaces on the fixed member 24 and the respective guiding surfaces of the keeper 1 provides restraint, when the device is fastened, in a direction transverse to the fastening direction. A wedge 26 spring loaded in the fastening direction is mounted within the fixed member 24 to protrude from the upper surface thereof, and this wedge 26 provides a wedging component of said restraint.

A spindle 27 of the part 3 passes through and is rotatably mounted in a backplate 28 and has its inner end supported in a cranked outrigger bearing plate 29 mounted on the backplate 28. Adjacent the inner surface of the backplate 28 a generally triangularly-shaped cam plate 30 is fixed on the cam spindle 27 in a plane parallel to the backplate 28. A torsion spring 32, mounted around the spindle 27 with its ends respectively engaging the bearing plate 29 and the cam plate 30, urges the plate 30 and with it the part 3 to said normal resting position.

The cam plate 30 forms part of an internal releasing mechanism which acts to apply a positive turning movement to the rotatable part 3 in the uncoupling direction during the releasing operation and is arranged to be actuated optionally from outside the door by an external release member in the form of a pushbutton or from inside the door through a remote control linkage. A raised arcuate portion 33 pressed in the backplate 28 provides a bearing surface for the cam plate 30 during rotary movement of the latter.

A contactor lever 34 of the releasing mechanism is pivotally mounted at 35, on an inwardly cranked upper portion of the backplate 28, with an intermediate portion 36 turned inwardly towards the backplate 28 to present a contactor face facing towards the outer door panel for engagement by the pushbutton stem, which is not illustrated but has its line of action aligned with the line A—A. At its lower end the lever 34 has a further inwardly turned portion 37 presenting a lower convex surface which engages a cam plate pad 38, formed from a resilient low-friction material such as nylon, mounted on a lower outwardly turned portion 39 of the cam plate 30. A tension spring 40 between the backplate 28 and the lever 34 urges the latter to its normal position in which the portion 37 abuts an upturned portion 42 of the backplate 28. This portion 42 forms part of the aforesaid stop means and, with the lever 34 in said normal position, abutment of the pad 21 on the portion 37 under the influence of the spring 32 defines said normal resting position of the part 3.

Inward movement of the pushbutton stem along the line A—A displaces the lever 34 anti-clockwise, as viewed in FIGURE 5, to displace the cam plate 30 in the same direction thereby imparting a positive turning movement. This acts to turn the part 3 in the uncoupling direction out of coupling engagement with the part 1, whereupon the door can be opened freely to separate the parts 1 and 3.

A portion 43 of the backplate 28 is bent up at right angles to the remainder of the backplate 28 along the forward edge thereof, and a remote control lever 44 is pivotally mounted between the portion 43 and an upturned portion 45 of the bearing plate 29. The lever 44 has an outwardly extending arm 46 formed for attachment to said remote control linkage (which is also not illustrated) and an inwardly directed arm with an inwardly turned portion 47 at its inner end. The cam plate 30 has a further upturned portion 48 against which the portion 47 of the lever 44 bears to turn the part 3 in the uncoupling direction during clockwise pivoting movement of the lever 44, as viewed in FIGURE 6, during a releasing movement of the remote control linkage.

The device can be locked from inside the vehicle by means of the remote control linkage and to this end the arm 46 of the lever 44 has an inwardly turned outwardly cranked locking portion 49 which presents a locking surface facing towards the contactor lever 34. When the remote control lever 44 is moved in its locking direction, i.e. the direction opposite to its releasing direction, to its locking position the locking portion 49 blocks inward movement of the contactor lever 34 so that the device cannot be released by means of the pushbutton. The locking position of the lever 44 is defined by abutment of the upper arm 46 thereon on an inwardly turned upper section 50 of the backplate portion 43.

Movement of the cam plate 30 in the uncoupling direction is limited by engagement with a further inwardly turned portion 51 of the backplate 28; such engagement thus defines the fully uncoupled position of the part 3. The aforesaid fixed member 24 is mounted on the outer face of the backplate 28, as is a shroud 52 for the rotatable part 3, this shroud being omitted from FIGURE 6.

From the foregoing description it will be clear that both portions 8 and 9 of the rotatable part 3 can be formed so that, when in the coupling position, the overall width of the part 3 is very small. In previous fastening devices of this type the rotatable part has possessed only a single projecting cam portion, equivalent to the portion 9 having the above described cam profile, which provides both initial engagement and coupling engagement with the keeper corresponding to the part 1. Thus, this single cam portion of previous devices has had to have a large front lobe for initial engagement with its keeper so that the rotatable part has necessarily had a much greater overall width in the fastening direction, which has governed the minimum width of door pillar with which such a device has previously been usable.

We claim:

1. A releasable fastening device comprising a cam rotatably mounted about an axis, said cam having first and second distinct portions thereon, said first and said second portions being spaced from each other and projecting from one face of the cam in the general direction of said axis, a keeper having third and fourth separate portions thereon, said third and said fourth portions being spaced from each other and similarly projecting from one face to the keeper for engagement with said cam portions during a fastening operation, spring means urging said cam towards a relative coupling position in the angular sense about said axis, and means for mounting said cam and said keeper so that said first and said third portions initially engage each other during a fastening operation and rotate the cam, against said spring means, away from said relative coupling position, and said third portion thereupon enters the space between said first and said second portions to enable said second and said fourth portions to move into coupling engagement with each other close to said axis at the end of the fastening operation.

2. A releasable fastening device according to claim 1, wherein said second and said fourth portions have their interengaging surfaces oriented normal to the fastening direction in their coupled position, which substantially aligns any reaction force between them, resulting from a tendency for relative translatory movement in the opening direction, with said opening direction and thus produces substantially no torque about the rotational axis of said cam.

3. A releasable fastening device according to claim 2, wherein said second and said fourth portions when in coupling engagement contact each other at a point slightly offset from said axis in the direction of relative movement of said cam during the fastening operation.

4. A releasable fastening device comprising in combination: a rotatably mounted cam having first and second distinct, projecting portions thereon which are spaced from each other with said first portion mounted forwardly of said second portion; a non-rotatable keeper having third and fourth separate, projecting portions thereon which are also spaced from one another; said cam and said keeper undergoing relative angular and translatory motion during a fastening operation; spring means urging said cam in the angular sense towards a relative coupling position; stop means for defining said relative coupling position of said cam; and means for mounting said cam and said keeper so that said first and said third portions initially engage each other during a fastening operation to rotate said cam, against said spring means, away from said relative coupling position, said third portion being positioned to enter subsequently the space between said first and said second portions in order to enable said second and said fourth portions to move into coupling engagement with each other substantially at the rotational axis of said cam at the end of the fastening operation.

5. A releasable fastening device according to claim 4, wherein each of said second and said fourth portions contains a step, said two steps engaging each other in the relative coupling position of said cam, and said second portion is disposed above said axis with its step located in its lower surface.

6. A releasable fastening device according to claim 4, wherein said first and said third portions are relatively positioned so that, after their initial engagement and the rotation of said cam away from the relative coupling position, said first portion engages the outer surface of said third portion to provide a "safety lock" condition, said second and said fourth portions being then in surface contact with each other in order to locate positively said cam and said keeper in the fastening direction, and wherein the reaction force between said cam and said keeper as a result of any tendency for opening movement when they are in said "safety lock" condition passes substantially through said rotational axis, thereby producing substantially no torque about said axis.

7. A releasable fastening device according to claim 6, wherein said third portion is provided with a front, downwardly and rearwardly inclined, sinuous profile including a leading crest, said first portion engaging behind said crest in said "safety lock" condition.

References Cited in the file of this patent

UNITED STATES PATENTS

| | | |
|---|---|---|
| 2,246,786 | Dall | June 24, 1941 |
| 2,634,147 | Robertson | Apr. 7, 1953 |
| 2,674,483 | De Vito | Apr. 6, 1954 |
| 2,814,193 | Roethel | Nov. 26, 1957 |
| 2,863,688 | Endter | Dec. 9, 1958 |